US012664024B2

(12) United States Patent
Shilov et al.

(10) Patent No.:    US 12,664,024 B2
(45) Date of Patent:        Jun. 23, 2026

(54) DECENTRALIZED SCHEDULER OF COMPUTATION JOBS FOR UNSTABLE NETWORK OF HETEROGENOUS NODES

(71) Applicant: Hamilton Sundstrand Corporation, Charlotte, NC (US)

(72) Inventors: Alexander Shilov, Weatogue, CT (US); Massimiliano L. Chiodo, Oakland, CA (US); Franklin R. Tanner, Leesburg, VA (US); Trevor D. Davis, Melissa, TX (US)

(73) Assignee: Hamilton Sundstrand Corporation, Charlotte, NC (US)

( * ) Notice:   Subject to any disclaimer, the term of this patent is extended or adjusted under 35 U.S.C. 154(b) by 649 days.

(21) Appl. No.: 18/126,170

(22) Filed:   Mar. 24, 2023

(65)   Prior Publication Data
US 2025/0217200 A1     Jul. 3, 2025

(51) Int. Cl.
*G06F 9/50*          (2006.01)

(52) U.S. Cl.
CPC ............ *G06F 9/505* (2013.01); *G06F 9/5038* (2013.01); *G06F 2209/5017* (2013.01)

(58) Field of Classification Search
CPC ................... G06F 9/505; G06F 9/5038; G06F 2209/5017; G06F 2209/503; G06F 9/5027; G06F 9/5044
(Continued)

(56)    References Cited

U.S. PATENT DOCUMENTS 8,296,765 B2    10/2012 Kurdi
10,581,712 B2    3/2020 D'Ercoli et al.
(Continued)

FOREIGN PATENT DOCUMENTS

CN        106919445 B        8/2021
EP        3899900 A1        10/2021
(Continued)

OTHER PUBLICATIONS

Chao-Ju Hou et al: "Load Sharing With Considerating of Future Task Arrivals in Heteroneneous Distributed Real-Time Systems", IEEE Transactions on Computers, IEEE, USA. vol. 43, No. 9, Sep. 1, 1994.
(Continued)

*Primary Examiner* — Adam Lee
(74) *Attorney, Agent, or Firm* — Suiter Swantz IP

(57)         ABSTRACT
A decentralized scheduler node for an unstable network of heterogenous nodes collects status information including a resource capacity of each of a network of nodes with which it is in communication. For each current computation job in its input queue, the scheduler node determines which connected nodes have suitable resource capacity to execute the current job and a reliability of each suitable node based on statistical evaluation of its historical availability for job deployment. From the set of suitably powerful and reliable candidate nodes, the scheduler node selects a candidate node of sufficient resource capacity for deployment of the current job based on the probability of a subsequent job appearing during the execution time of the current job, the subsequent job having an equivalent or greater resource requirement and thus at risk of waiting in the input queue if the selected node is required for executing the subsequent job.

20 Claims, 6 Drawing Sheets

(58) Field of Classification Search
USPC ......................................................... 718/105
See application file for complete search history.

(56) References Cited

U.S. PATENT DOCUMENTS

| | | | |
|---|---|---|---|
| 10,628,219 | B2 | 4/2020 | Joseph |
| 11,416,286 | B2 | 8/2022 | Yan et al. |
| 11,422,853 | B2 | 8/2022 | Bacthavachalu et al. |
| 11,422,854 | B2 | 8/2022 | Du et al. |
| 11,463,537 | B1* | 10/2022 | Suckel .................... H04L 63/08 |
| 2003/0103055 | A1* | 6/2003 | DaSilva ............. H04N 21/2312 |
| | | | 348/E5.007 |
| 2006/0069861 | A1* | 3/2006 | Amano ............... G06F 11/1471 |
| | | | 711/170 |
| 2011/0029981 | A1* | 2/2011 | Jaisinghani ........... G06F 11/203 |
| | | | 718/100 |
| 2012/0134268 | A1* | 5/2012 | Lopez ................... H04W 76/12 |
| | | | 370/232 |
| 2013/0022202 | A1* | 1/2013 | Stroud ................ H04W 12/033 |
| | | | 380/270 |
| 2013/0124336 | A1* | 5/2013 | Fein ......................... H04L 67/63 |
| | | | 705/14.66 |
| 2013/0339971 | A1* | 12/2013 | Boland ................. G06F 9/4881 |
| | | | 718/104 |
| 2013/0346969 | A1 | 12/2013 | Shanmuganathan et al. |
| 2018/0123683 | A1* | 5/2018 | Wakabayashi ........ H04W 40/22 |
| 2018/0136979 | A1 | 5/2018 | Morris |
| 2018/0150343 | A1* | 5/2018 | Bernat .................. G06F 3/0647 |
| 2018/0267709 | A1* | 9/2018 | Olson ................. G06F 11/3006 |
| 2019/0266020 | A1* | 8/2019 | Mehra .................. G06F 9/5027 |
| 2020/0272509 | A1* | 8/2020 | Wright .................. G06F 9/4881 |
| 2021/0089350 | A1 | 3/2021 | Bezalel et al. |
| 2021/0240354 | A1* | 8/2021 | Shiraki ................ G06F 9/4843 |
| 2022/0350651 | A1 | 11/2022 | Ray et al. |
| 2022/0391244 | A1 | 12/2022 | Gustafsson et al. |

FOREIGN PATENT DOCUMENTS

| | | |
|---|---|---|
| EP | 4002115 A1 | 5/2022 |
| IN | 201917043424 A | 10/2018 |
| WO | 2012087767 A2 | 6/2012 |
| WO | 2017128507 A1 | 8/2017 |
| WO | 2019006907 A1 | 1/2019 |
| WO | 2022047621 A1 | 3/2022 |

OTHER PUBLICATIONS

Ramamritham Krithivasan et al. "Dynamic task scheduling in hard real-time distributed systems", IEEE software 1.3 (1984): 65, Aug. 1, 1984 (Aug. 1, 1984), pp. 65-75, XP093132824, Retrieved from the Internet: URL:https://ieeexplore.ieee.org/stamp/stamp.jsp?tp=?arnumber=1695183.

Schwarzkopf, Malte et al., "Omega: flexible, scalable schedulers for large compute clusters" EuroSys' 13, Apr. 15-17, 2013, Prague, Czech Republic.

* cited by examiner

100

200

202

Node 204a

Node 204b

Node 204c

NEW S/I
220

Node 204d

118

210a

Tx/Rx
210

PROCESSORS
212

MEMORY 214

Hist S/I 216

Jobs 218

*FIG. 2*

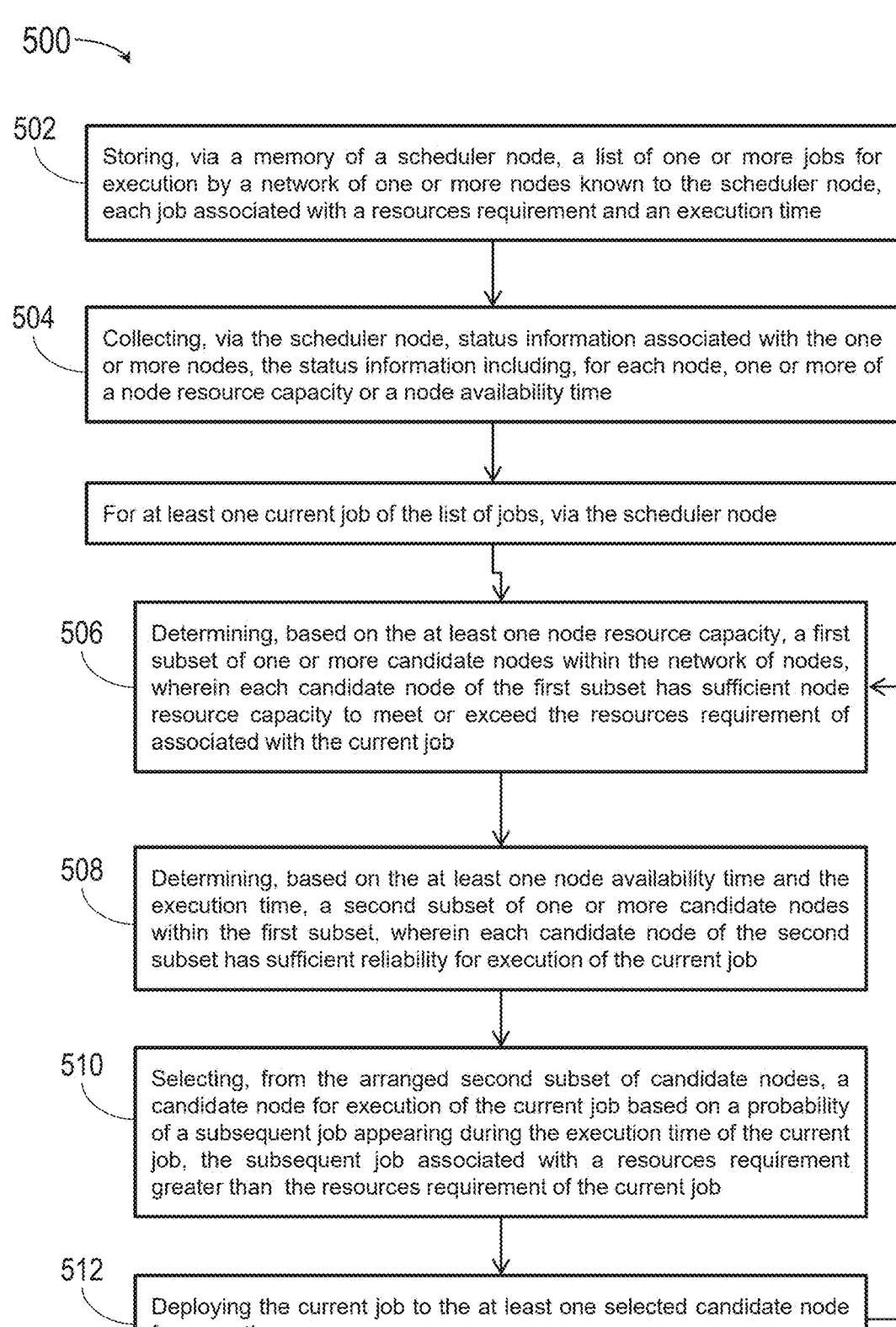

500

502
Storing, via a memory of a scheduler node, a list of one or more jobs for execution by a network of one or more nodes known to the scheduler node, each job associated with a resources requirement and an execution time 504
Collecting, via the scheduler node, status information associated with the one or more nodes, the status information including, for each node, one or more of a node resource capacity or a node availability time For at least one current job of the list of jobs, via the scheduler node 506
Determining, based on the at least one node resource capacity, a first subset of one or more candidate nodes within the network of nodes, wherein each candidate node of the first subset has sufficient node resource capacity to meet or exceed the resources requirement of associated with the current job 508
Determining, based on the at least one node availability time and the execution time, a second subset of one or more candidate nodes within the first subset, wherein each candidate node of the second subset has sufficient reliability for execution of the current job 510
Selecting, from the arranged second subset of candidate nodes, a candidate node for execution of the current job based on a probability of a subsequent job appearing during the execution time of the current job, the subsequent job associated with a resources requirement greater than the resources requirement of the current job 512
Deploying the current job to the at least one selected candidate node for execution

Receiving a rejection of the current job from the selected candidate node

516

Deploying the current job to a second node of the network

DECENTRALIZED SCHEDULER OF COMPUTATION JOBS FOR UNSTABLE NETWORK OF HETEROGENOUS NODES

BACKGROUND

Centralized scheduling of computation jobs (e.g., service tasks, batch processing tasks) can be scaled up to large clusters of computing nodes, and split among multiple scheduler nodes, if each scheduler node maintains and updates full knowledge of the cluster, e.g., a current status of each computing node within the cluster. However, such shared-state scheduling is not always feasible among peer-to-peer networks or unstable networks of heterogenous computing nodes. For example, networks may comprise a broad variety of different computation platforms incorporating a similarly broad variety of capabilities. The network may itself be highly volatile in that communications channels between nodes may be unstable. Similarly, nodes may abruptly join or leave the network, and may therefore not have a reliable connection to a centralized scheduler node even where such nodes exist.

SUMMARY

In a first aspect, a scheduler node operating within an unstable network of heterogenous nodes (e.g., unstable in that nodes may arbitrarily join or leave the network, and that the network may include multiple scheduler nodes operating unknown to each other, each scheduler node potentially connected to a different network of nodes; heterogenous in that each network of nodes in communication with a scheduler node may include a broad variety of nodes with varied resource capabilities) is disclosed. In embodiments, the scheduler node includes processors, memory/data storage, and a communications interface for sending and receiving messages to and from its network of nodes. For example, the scheduler node stores to memory an input queue, or a list of computation jobs for deployment and execution among its network nodes; each job may have at least an execution time and a resources requirement (e.g., a number of processing cores required, or other measure of computing resources required to perform the job within its execution time). For each job in its input queue, the scheduler node collects statistical status information from its network nodes, e.g., a resource capacity of each node, or the number of cores or other computing resources available to the node, and a node availability time, e.g., a duration or time that the node has historically been available to the scheduler node for execution of deployed jobs. The scheduler node determines which of its network nodes have sufficient resource capacity to execute the current job, eliminating all other nodes from consideration with respect to the current job. Based on the subset of candidate nodes, or those network nodes having sufficient resources for the current job, the scheduler node determines how reliable each candidate node may be with respect to executing the current job within its execution time without failure, e.g., based on historical node availability. Insufficiently reliable candidate nodes may be removed from the subset of candidate nodes. From the revised subset of those candidate nodes having both sufficient resources and sufficient reliability for the current job, the scheduler node selects an optimal candidate node for execution of the current job based on the probability of a subsequent job appearing during the execution time of the current job and requiring the candidate node (e.g., or a candidate node of equivalent or greater resource capacity) for optimal execution of the subsequent job. The scheduler node assigns the current job to the selected candidate node for execution (e.g., and proceeds to the next job in its input queue).

In some embodiments, the scheduler node collects current statistical status information from stable collector nodes within the network.

In some embodiments, the scheduler node stores historical statistical status information associated with, e.g., each network node and each computation job executed throughout the network. For example, if more current status information is available to the scheduler node, the stored historical status information may be updated. Similarly, if no current status information is available, the scheduler node may retrieve historical statistical status information from memory.

In some embodiments, based on collected statistical status information the scheduler node may add or delete nodes to or from its network.

In some embodiments, the scheduler node orders the subset of candidate nodes (e.g., those candidate nodes having sufficient resources to execute the current job, or the revised subset of candidate nodes having both sufficient resources and sufficient reliability) by resource capacity, e.g., from most powerful (highest resource capacity) to least powerful (lowest resource capacity).

In some embodiments, the scheduler node determines node reliability based on the execution time of the current job and the node availability of the current node, and orders the revised subset of sufficiently reliable candidate nodes first by resource capacity and second by reliability (e.g., given two nodes of equivalent resource capacity, the node having a higher reliability is ordered higher and assessed first for deployment of the current job).

In some embodiments, the scheduler node revises the subset of candidate node by removing any candidate node having insufficient reliability for the current job.

In some embodiments, the scheduler node selects a candidate node for execution of the current job by assessing each candidate node of the revised subset in order (e.g., in descending order of resource capacity) and selecting the most powerful node for which the probability of a subsequent job (e.g., of greater resource requirement than the resource capacity of the assessed candidate node) appearing is not greater than a threshold level.

In some embodiments, no candidate node is found for which the probability of the subsequent job appearing is not greater than the threshold level (e.g., the probability of the subsequent job appearing exceeds the threshold level for every candidate node of the second subset), and the scheduler node selects the least powerful candidate node (e.g., the last candidate node in the ordered revised subset) for execution of the current job.

In some embodiments, the scheduler node receives a rejection of the current job from the selected candidate node. For example, on receiving a rejection the scheduler node re-deploys the current job to another node of the network (e.g., another candidate node, or another node selected via a reiteration of the selection process).

In a further aspect, a method for decentralized scheduling of computation jobs among an unstable network of heterogenous nodes is also disclosed. In embodiments, the method includes storing, via a scheduler node of the unstable network, an input queue of computation jobs for execution by the network of nodes known to the scheduler node, wherein each job has an execution time and a resource requirement associated with performance of the job within its execution time. The method includes collecting, via the scheduler node, statistical status information about the network of nodes, including resource capacities (e.g., available processors, cores, memory, etc.) and availability times (e.g., how long the node has been available to the scheduler node for job deployment) for each node. The method includes, for each current job in the input queue, determining a subset of candidate nodes within the network, where each candidate node included in the subset has sufficient resource capacity to perform the current job within its execution time. The method includes determining a revised subset within the subset of candidate nodes, wherein each candidate node of the revised subset also has sufficient node reliability to perform the current job (e.g., without a failure during the execution time). The method includes, within the revised subset of candidate nodes having sufficient node resource capacity and sufficient reliability, selecting a candidate node for execution of the current job based on the probability of a subsequent job appearing during the execution time of the current job, the subsequent job requiring greater resources than the current job (e.g., and thus requiring the candidate node for optimal execution within its execution time). The method includes deploying the current job to the selected candidate node.

In some embodiments, the method includes collecting status information from stable collector nodes within the network.

In some embodiments, the method includes storing, via the scheduler node, historical status information about the network of nodes. The method further includes, if no current status information is available, retrieving the historical status information from memory.

In some embodiments, the method includes adding or deleting nodes to or from the network based on the status information.

In some embodiments, the method includes ordering the subset of candidate nodes according to node resource capacity.

In some embodiments, the method includes determining a reliability of each candidate node based on its node reliability time. The method further includes ordering the subset of candidate nodes first by node resource capacity and second by node reliability.

In some embodiments, the method includes removing from the subset of candidate nodes having sufficient resources any candidate node determined insufficiently reliable for execution of the current job.

In some embodiments, the method includes assessing each candidate node of the revised subset of candidate nodes (e.g., having both sufficient resources and sufficient reliability to execute the current job) in descending order of node resource capacity, and selecting for execution of the current job the candidate node having the highest resource capacity wherein the probability of the subsequent job appearing during the execution time of the current job does not exceed a threshold level.

In some embodiments, the method includes, when no assessed candidate node is found for which the probability of the subsequent job appearing during the execution time of the current job does not exceed the threshold level (e.g., the probability of the subsequent job appearing exceeds the threshold level for every candidate node of the second subset), selecting the candidate node having the least resource capacity (e.g., the last candidate node in the input queue) for execution of the current job.

In some embodiments, the method further comprises receiving a rejection of the current job from the selected candidate node to which the job was deployed. The method further includes re-deploying the current job to an alternative node of the network.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2 is a block diagram illustrating components of a decentralized scheduler node of the unstable network of FIG. 1 according to example embodiments of this disclosure;

DETAILED DESCRIPTION

Figure 1:
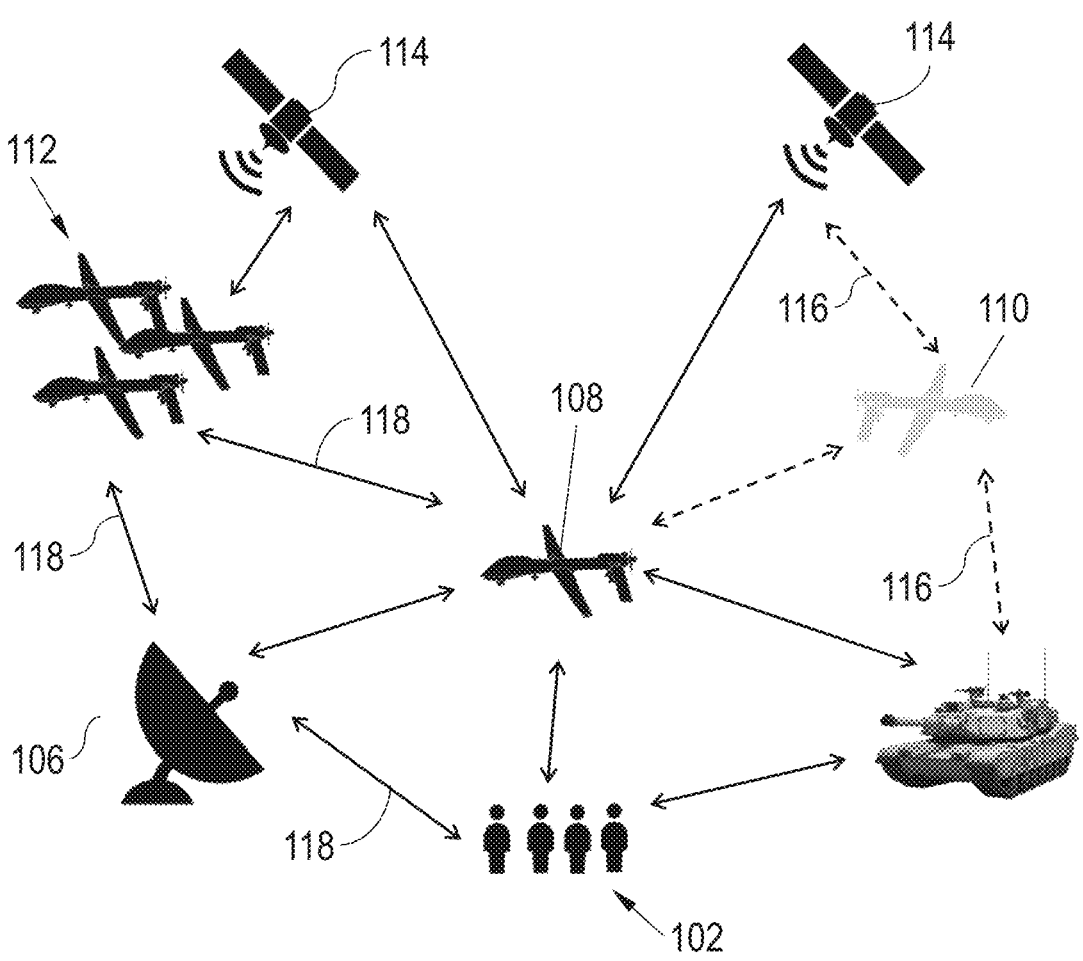
FIG. 1 is a block diagram illustrating an unstable network of heterogenous computing nodes.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Embodiments of the inventive concepts disclosed herein are directed to systems and methods for decentralized scheduling of computation jobs and tasks among unstable networks of heterogenous computing nodes. For example, in shared-state networks, dedicated schedulers can "see" or "know" their entire cluster of nodes or machines in that each scheduler maintains communications with the full cluster and therefore has full knowledge of the available resources distributed throughout the cluster at any time. Further, multiple schedulers "know" each other via this atomic shared state, and may resolve any scheduling conflicts based on shared-state comparisons. In an unstable network topology, however, the shared state is impossible to implement. Network nodes and communication channels may leave or join the network arbitrarily. Further, node resources and capabilities may vary widely, as may the nature and requirements of assigned jobs and tasks.

Decentralized scheduling is based on the notion that few schedulers work independently. Even sets of nodes (e.g., within the larger network) that different schedulers are in communication with, and operating on, may be different because of unstable network topology. Schedulers may not know about nodes that are not accessible to them at any given moment, and may know nothing about other schedulers. Under these circumstances, global optimization of a network is not possible. Local decentralized schedulers can only optimize their performance (greedy scheduling) at the expense of other schedulers, and ultimately at the expense of network performance as a whole.

The inventive concepts disclosed herein are based on the concept that global network optimization (or, e.g., approximation of global optimization across such an unstable network topology) requires additional information of the network that is provided in the form of network statistical information. In embodiments, the system recognizes that network performance is a statistical property, and accordingly collects and harnesses the statistical characteristics (distributions) of nodes and jobs to optimize overall network performance through scheduler nodes and local node networks. For example, statistical distributions collected by schedulers are limited by the local set of nodes accessible to each scheduler but additional information, e.g., received by a scheduler from other schedulers or collectors accessible to that scheduler, can expand the reach of statistical distributions within a local set beyond that local set to a wider part of the network, and potentially to the network as a whole.

Referring now to FIG. 1, a network 100 of heterogenous computing nodes is shown. The network 100 may include mobile ground combatants 102, mobile ground vehicles 104, fixed-location ground facilities 106, uncrewed aircraft systems 108, 110 (UAS), UAS swarms 112, and satellites 114.

In embodiments, the network 100 may have an unstable topology (and, e.g., may be dissimilar from a cluster of tightly coupled, homogenous nodes) in that the set of heterogenous computing nodes (which may include, e.g., mobile ground combatants 102, mobile ground vehicles 104, fixed-location ground facilities, UAS 108, UAS swarm 112, and/or satellites 114), and the set of communications channels 116, 118 connecting said nodes to each other, may be dynamic in membership from moment to moment as nodes both enter and leave the network, often on an arbitrary basis. For example, the UAS 110, having established a communications channel 116 between the mobile ground vehicle 104 and the satellite 114 (e.g., as a relay), may abruptly leave the network 100. Accordingly, the communications channel 116 may break down, and any other node depending on said communications channel for deployment of computation jobs (e.g., tasks) to destination nodes may be unable to deploy jobs to those destination nodes. Further, a centralized scheduler node of the network 100 may have no reliable means of knowing when nodes enter or leave the network, and thus no reliable way of deploying jobs throughout the network. Similarly, in embodiments the network 100 may be heterogenous in that each of its member nodes (e.g., mobile ground combatants 102, mobile ground vehicles 104, fixed-location ground facilities, UAS 108, UAS swarm 112, satellites 114) may have a unique set of processing or data storage resources at its disposal (and a unique set of tasks and/or jobs occupying or reserving some portion of said resources), such that a centralized scheduler node may not always have full information of the resource capacity of every node with which it can communicate, e.g., either via direct communications channel 118 or via a relay including two or more direct communications channels and one or more intermediate relay nodes. Further, any centralized scheduler node purporting to operate within the network 100 may have no reliable information about other nodes with which the scheduler node is not in communication, or about any other node currently operating as a scheduler node.

In embodiments, the network 100 may more efficiently operate as a decentralized network wherein each member node is responsible for maintaining communications channels with other nodes, and wherein each member node has the capacity to act as both client and server with respect to other nodes (e.g., and thus as a scheduler of computation jobs and/or tasks to other nodes with which the node is in communication). Accordingly, in embodiments multiple nodes of the network 100 (e.g., mobile ground combatants 102, mobile ground vehicles 104, fixed-location ground facilities, UAS 108, UAS swarm 112) may operate as decentralized scheduler nodes in that each scheduler node may be assigned a set of computation jobs or tasks (e.g., service jobs, batch processing jobs) for deployment to any nodes with which the scheduler node is connected. For example, as global network optimization (which requires information about each node, and about the jobs or tasks queued by each scheduler within the network) may be difficult or effectively impossible within the dynamic and/or unstable environment of the network 100, each scheduler node may instead locally optimize its performance relative to other scheduler nodes within the network 100 (even though multiple scheduler nodes within the network may be ignorant of each other and/or of any member nodes to which they are not directly connected).

In embodiments, local optimization of decentralized scheduler nodes within the network 100 may be achieved through the collection and maintenance of network statistical information with respect to which nodes are currently a part of the network, how those nodes will perform (or have performed) when assigned a job or task, and the jobs queued by each node. For example, each decentralized scheduler node may collect and maintain status information as to the resource capacity (e.g., processing capacity, number of processing cores, memory/data storage capacity, duration as a "known" node available for job deployment) of each network node known to it (e.g., a node is "known" to a scheduler node if a communications channel exists between the two nodes, via which messages may be regularly transmitted and received between the two nodes). Further, decentralized scheduler nodes may maintain and store historical status information as to the deployment of jobs to known nodes, and the performance of said jobs by the nodes to which the jobs are deployed (e.g., whether the node completed a job assigned to it without a failure).

Figure 2:
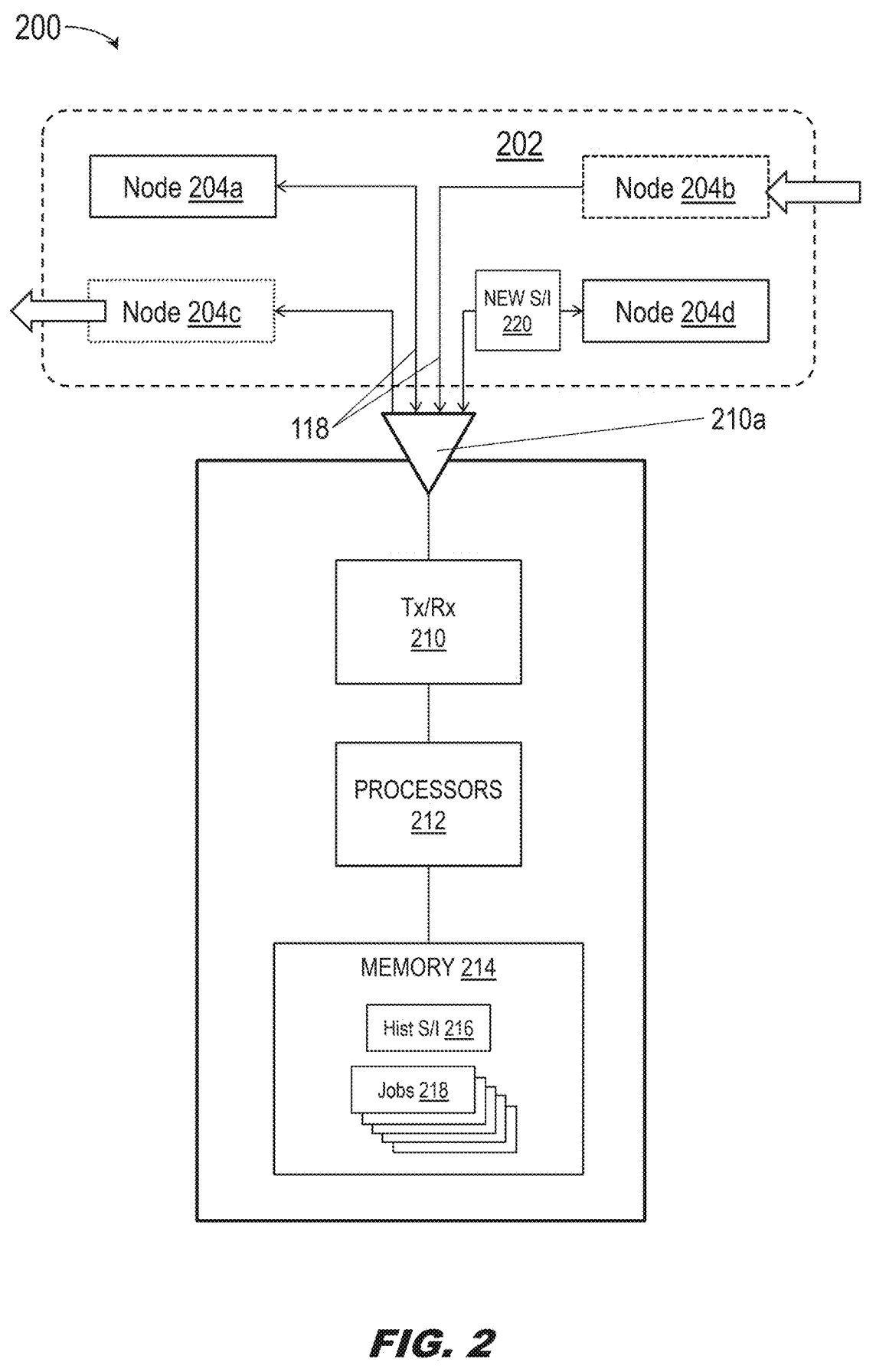

Referring to FIG. 2, the decentralized scheduler node 200 is shown.

In embodiments, any node within the unstable network 100 shown by FIG. 1 (e.g., mobile ground combatants 102, mobile ground vehicles 104, fixed-location ground facilities 106, UAS 108, 110 (UAS), UAS swarms 112, satellites 114) may operate as a scheduler node 200 with respect to a set 202 of network nodes 204a-204d known to the scheduler node (e.g., each node 204a-204d likewise being a member node of the network 100).

In embodiments, the scheduler node 200 may include communications (transmission/reception (TxRx)) interface 210, processors 212, and memory 214 (e.g., non-transitory memory or any like appropriate data storage). For example, the communications interface 210 may allow for the transmission and reception of messages between the scheduler node 200 and network nodes 204a-204d via direct communications channels 118 (and, in some embodiments, via antenna elements 210a). In some embodiments, the scheduler node 200 may communicate with other known network nodes 204a-204d within the set 202 via messages relayed by the network nodes. Further, the set 202 may gain or lose members (and communications channels 118, 116) as network nodes are deleted from (204c) and/or are added (204b) to the set, e.g., based on new status information. In embodiments, if all known network nodes 204a-204d are deleted (204c) from the set 202, the scheduler node 200 may cease to operate as a scheduler node. In some embodiments, the scheduler node 200 may deploy computation jobs to other scheduler nodes within the network 100, or receive for execution computation jobs deployed by other scheduler nodes. For example, the scheduler node 200 may receive jobs deployed by other scheduler nodes (e.g., based on the scheduler node's own resource capacity) and may execute deployed jobs independent of its own scheduling operations.

In embodiments, the scheduler node 200 may periodically scan the set 202 of network nodes 204a-204d to determine a status of each known network node. For example, a scan for status information may determine the current member nodes 204a-204d of the set 202 and/or additional status information with respect to each network node, e.g., a resource capacity of each node (e.g., the number and type of processing cores (the computing power of each particular node), data storage capacity of the network node), and/or a node availability time of each node for deployment (e.g., a duration each node has historically been connected to the scheduler node 200 and/or available for execution of deployed jobs). The memory 214 may store historical status information 216 with respect to the network nodes 204a-204d, including identifying information for each network node and the historical resource capability and/or node availability time of each network node. Further still, historical status information 216 may include information about computation jobs that have been run on the network node 204a-204d (e.g., whether each job completed in its allotted execution time without a failure on the part of the network node).

In embodiments, the memory 214 may further store a list 218 (e.g., input queue) of computation jobs or tasks assigned to the scheduler node 200 for deployment to the known network nodes 204a-204b within its set 202. For example, as the scheduler node 200 deploys jobs to the network nodes 204a-204d according to the input queue 218, the scheduler node may collect further historical status information 216 with respect to each network node 204a-204d.

In embodiments, the scheduler node 200 may scan (e.g., via the communications interface 210) the set 202 of network nodes 204a-204d and thereby collect new status information 220 from one or more collector nodes 204d within the set. For example, the collector node 204d may be a reliable node (or may have itself served as a scheduler node) capable of providing the scheduler node 200 with new or additional information with respect to one or more of the network nodes 204a-204c within the set 202 (e.g., with respect to node resource capacity or node availability time). If, for example, the new status information 220 is more current or more reliable than the historical status information 216 stored to memory 214 by the scheduler node 200, the historical status information may be updated accordingly. In embodiments, if no new status information 220 is obtained, the scheduler node 200 may assess or re-assess (e.g., periodically assess) the resource capacity and/or node availability time of each network node 204a-204d based on historical status information 216.

In embodiments, each scheduler node 200 will execute its allotted input queue 218 of jobs as quickly as possible (e.g., greedy algorithm). For example, the input queue 218 stored to memory 214 by the scheduler node 200 may be a sequential queue including, for each job, a resources requirement (e.g., the processing power or number of processing cores, memory/data storage capacity, or specific amount of other resources required for optimal job completion), a job execution time (e.g., the amount of time required for the job to complete), and/or a priority level (higher or lower depending on, e.g., when the job must be started and/or completed). In some embodiments, some or all of the input queue 218 of jobs may be deployed and executed in any order or, for example, jobs having a higher priority level (e.g., jobs which must be started or completed within a particular time) may rise to the front of the input queue for deployment before jobs having a lower priority level.

Figure 3:
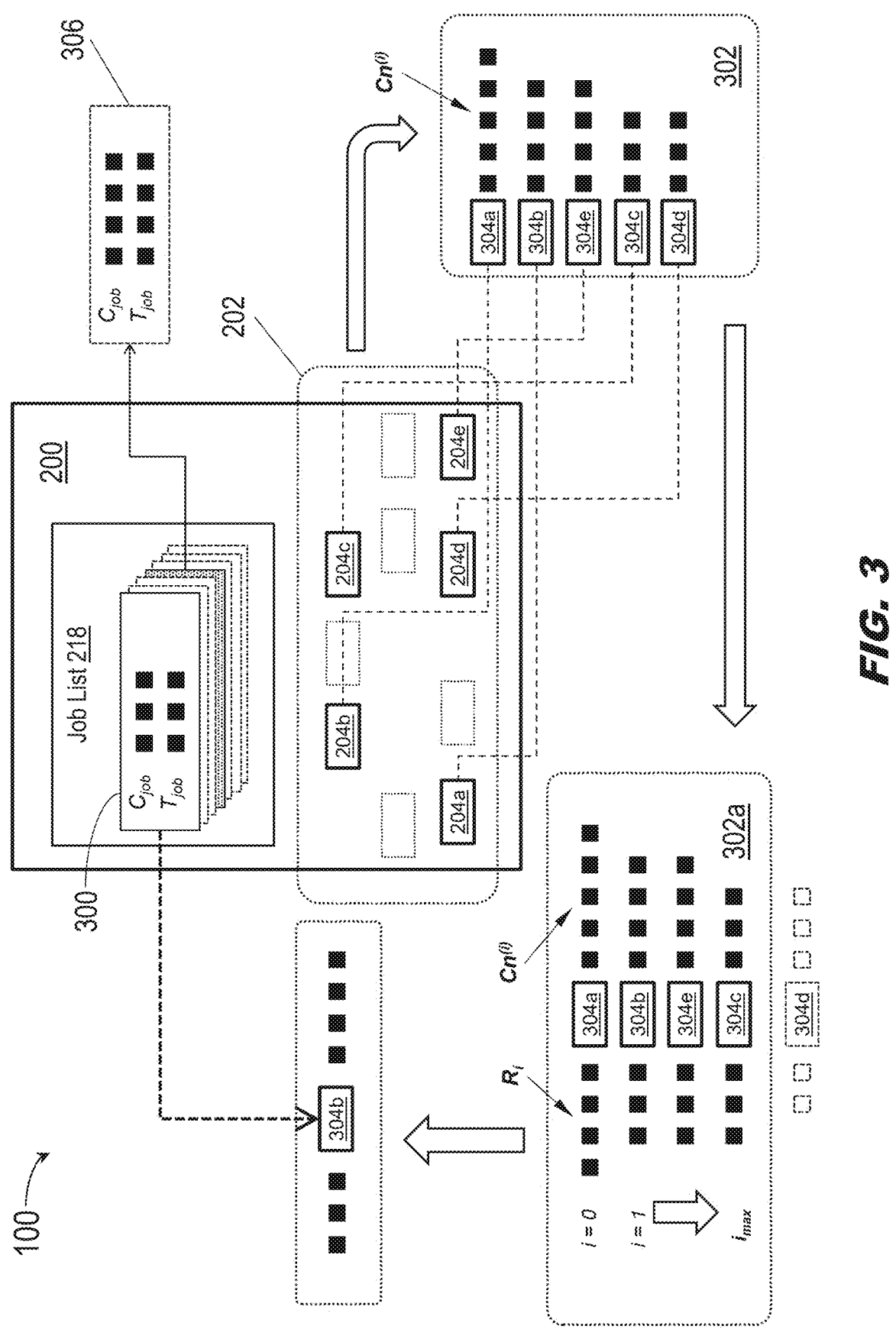
FIG. 3 is a diagrammatic illustration of decentralized scheduling operations of the scheduler node of FIG. 2 according to example embodiments of this disclosure.

Referring now to FIG. 3, the network 100 is shown.

In embodiments, for each current job 300 on its job list 218 (e.g., where the current job is the next undeployed job in the input queue), the scheduler node 200 may first determine which, if any, of its set 202 of network nodes 204a-204d have sufficient resources to execute the current job. For example, in establishing a first subset 302 of candidate nodes i (304a-304e), e.g., the subset of all network nodes 204a-204d of the set 202 having sufficient resource capacity to execute a current job 300 having resource requirement $C_{job}$ (where $C_{job}$ is, e.g., the number of processing cores required for the execution of the current job within its allotted execution time $T_{job}$), the scheduler node 200 may select as a candidate node 304a-304e any network node i 204a-204e having at least $Cn^{(i)}$ cores, where $Cn^{(i)} \geq C_{job}$.)

In embodiments, given the subset 302 of candidate nodes i 304a-304e known to the scheduler node 200 and having sufficient resource capacity (wherein, by way of a non-limiting example, $Cn^{(i)}$ is a number of CPU cores of candidate node i) for the current job 300, the scheduler node 200 may assess each node of the first subset of candidate nodes i to determine a reliability $R_i(t)$ characterizing the probability of each candidate node i to be operational without failure for a particular time interval t (e.g., connected to the network 100 and/or scheduler node 200 and ready to execute a deployed job). For example, the reliability function $R_i(t)$ for candidate node land time interval t may be based at least in part on status information of the candidate node, e.g., node availability time, or historical duration that the candidate node has been connected to the scheduler node 200 and available for deployed jobs therefrom. In embodiments, given a probability distribution f(t) of time intervals t that a candidate node i (304a-304e) is operational on the network 100, the reliability function $R_i(t)$ of a candidate node i may be expressed as $$R(t) = P[T > t] = \int_t^\infty f(x)dx$$

where P[T>t] is a probability that the node availability time (e.g., random value T) takes on values greater than the specified time interval t. For example, after estimating the probability distribution f(x), the reliability function $R_i(t)$ and the cumulative distribution function (CDF) Qn(t) of the node availability time can be calculated:

$$R_i(t) = P[T > t] = 1 - Qn(t) = 1 - \int_0^t f(x)dx$$

In embodiments, given the first subset 302 of candidate nodes i 304a-304e both known to the scheduler node 200 and determined by the scheduler node as having sufficient resource capacity for the current job, the scheduler node 200 may further assess the subset of candidate nodes i to determine a reliability $R_i(t)$ characterizing the probability of each candidate node i operating for a particular time interval t (e.g., that the candidate node i is both connected to the network 100 and/or the scheduler node 200 and ready to execute a deployed job). For example, the higher the reliability $R_i(t)$ of a candidate node i with respect to the current job, the lower the likelihood of failure if the current job is deployed to that candidate node.

In embodiments, the second subset 302a of candidate nodes 304a-304c, 304e may include all candidate nodes i determined by the scheduler node 200 to have sufficient resource capacity to execute the current job having resource requirement $C_{job}$ (and thus included in the first subset 302) but also having sufficient reliability that the probability of each candidate node executing the current job without failure during the execution time $T_{job}$ is at least a threshold acceptable level. For example, given a first subset 302 of candidate nodes i 304a-304e, each candidate node having $Cn^{(i)} \geq C_{job}$ cores, each core having a default specified core calculation power $V_j$ (e.g., in Gflops), and given a current job 300 having execution time $T_{job}$ and requiring $C_{job}$ cores, the candidate node i may be retained by the scheduler node 200 as a candidate node of the second subset 302a when the reliability $R_i(t)$ of the candidate node i is greater than a threshold level, e.g., a hyperparameter $hP_{node}$ defining sufficient reliability for deployment of the current job to that candidate node:

$$R^i\left(\frac{T_{job} * Vn^{(i)}}{V_j}\right) > hP_{node}$$

where, for example, $Vn^{(i)}$ is a calculation power of a single core of candidate node I.

In embodiments, the scheduler node 200 may reorder the second subset 302a of candidate nodes i 304a-304c, 304e primarily in order of resource capacity (e.g., in descending order by number of CPU cores $Cn^{(i)}$) and secondarily in order of reliability. Further, any candidate node i (304d) of the first subset 302 may be removed from (e.g., not retained in) the second subset 302a if the reliability $R_i(t)$ of the candidate node 304d fails to meet the threshold hyperparameter $hP_{node}$.

In embodiments, given the second subset 302a of candidate nodes i (304a-304c, 304e) having both sufficient resource capacity and sufficient reliability for executing the current job 300, the scheduler node 200 may optimize the deployment of the current job on its input queue 218 by accounting for the probability distribution of job types. For example, the cumulative distribution function $Q_k(t)$ (CDF) may characterize, for a current job 300 having a given resource requirement (e.g., $C_{job}$ cores) deployed to a selected candidate node i (304a-304c, 304e) having a given resource capacity (e.g., $Cn^{(i)}$ cores), another job of class k may subsequently appear during the execution time t of the current job having a resource requirement $C_{job(k)}$ (e.g., wherein $C_{job(k)}$ is a number of cores greater than $C_{job}$), such that the subsequent job 306 may be required to wait in the input queue of another scheduler until the selected candidate node is once again available for execution of a job, e.g., if no other candidate node of equivalent or greater resource capacity is available to a scheduler node (e.g., any scheduler node within the network 100) for execution of the subsequent job. In embodiments, the behavior of computation jobs and/or tasks to be executed throughout the network 100 may be characterized by the probability $Q_k(t)$ (e.g., the CDF) of a computation job of type k to be started within a particular time interval t; e.g., for a series of categories of jobs wherein the category index k is differentiated by a particular feature (e.g., number of required CPU cores, memory requirements, GPU requirements), such that:

$$Q_k(t) = P_k[T > t]$$

In embodiments, each scheduler node 200 may account for the probability distribution $Q_k(t)$ of jobs of type k to optimize the deployment and execution of jobs throughout the network 100, thus reducing waiting time in input queues 218 for more powerful jobs (e.g., those having the highest resource requirements) throughout the network and deploying every job to the optimal node for which the job is suited while not obstructing the deployment of more powerful jobs by other schedulers.

In embodiments, still referring to FIG. 3, the scheduler node 200 may be programmed for greed in that the scheduler node may select from the second subset 302a the most powerful (e.g., highest number of CPU cores $Cn^{(i)}$ or other like quantification of resource capacity) available candidate node i (304b) for execution of the current job 300. However, in the interest of optimization, the scheduler node 200 may seek to avoid a condition where, if the current job (having resource requirement $C_{job(cur)}$) is deployed to the most powerful reliable candidate node i 304b having at least $Cn^{(i)}$ cores where ($Cn^{(i)} > C_{job(cur)}$), a subsequent job 306 may appear (e.g., in the input queue/job list of scheduler node 200, or of any other scheduler node within the network 100) having a resource requirement $C_{job(k)} > C_{job(cur)}$, (e.g., where the subsequent job is a job of type k) such that the subsequent job requires the most powerful reliable candidate node i (304b) for deployment and completion with a minimal wait time.

In embodiments, the scheduler node 200 may perform local optimization of job deployment by determining, for each current job 300 having resource requirement $C_{job(cur)}$, a sum of probability distributions $Q_k(t)$ of all possible subsequent jobs 306 of job category k (e.g., $Q_k(t)$ having job category k and an execution time t) having a resource requirement $C_{job(k)}$ satisfying $Cn^{(i)} \geq C_{job(k)} > C_{job(cur)}$ and appearing during the execution time $T_{job}$ of the current job, such that $$\sum_{k=0}^{Cn^{(i)} \geq C_{job(k)} > C_{job(cur)}} Q_k \left( \frac{T_{job} * Vn^{(i)}}{V_{job(cur)}} \right) \leq hP_{job} * (i+1)$$

where hyperparameter $hP_{job}$ defines a threshold probability level that any subsequent job 306 of any type k that can be run on the candidate node i and having a higher resource requirement $C_{job(k)} > C_{job(cur)}$ will appear during the execution time $T_{job}$ of the current job 300.

For example, the scheduler node 200 may proceed through the second subset 302a of candidate nodes i (304a-304c, 304e; e.g., where i=0 to $i_{max}$, the second subset ordered primarily by resource capacity (e.g., in order of decreasing number of CPU cores $Cn^{(i)}$) and secondarily by node reliability $R_i$ (e.g., also in decreasing order), iteratively assessing less powerful/less reliable candidate nodes (e.g., 304b→304a→304e→304c) until for the currently assessed candidate node i, the total probability $\Sigma (Q_k)$ is not greater than the threshold hyperparameter $hP_{job}$, or until reaching the end (e.g., least powerful candidate node 304d, $i_{max}$) of the second subset 302a.

In embodiments, the candidate node i of the second subset 302a having the greatest resource capacity (e.g., 304a) may be passed over by the scheduler node 200 for deployment and execution of the current job 300. For example, if $\Sigma (Q_k) > hP_{job}$ for the most powerful candidate node i (e.g., 304a), that candidate node 304a may be reserved by the scheduler node 200 for a more powerful (and likely to appear) subsequent job 306, and the scheduler node may proceed to assess the next most powerful candidate node i+1 in the queue/list (e.g., 304b), and deploy the current job 300 to the next candidate node 304b if, for the candidate node 304b, $\Sigma (Q_k) \leq hP_{job}$. In embodiments, if no candidate node i (304a-304c, 304e) is found within the second subset 302a for which $\Sigma (Q_k) \leq hP_{job}$, (e.g., if $\Sigma (Q_k) > hP_{job}$ for every candidate node i (304a-304c, 304e) of the second subset 302a), the scheduler node 200 may select the least powerful candidate node 304d of the second subset (e.g., lowest resource capacity, lowest combination of resource capacity and reliability $R_i$) for deployment and execution of the current job 300.

Figure 4:
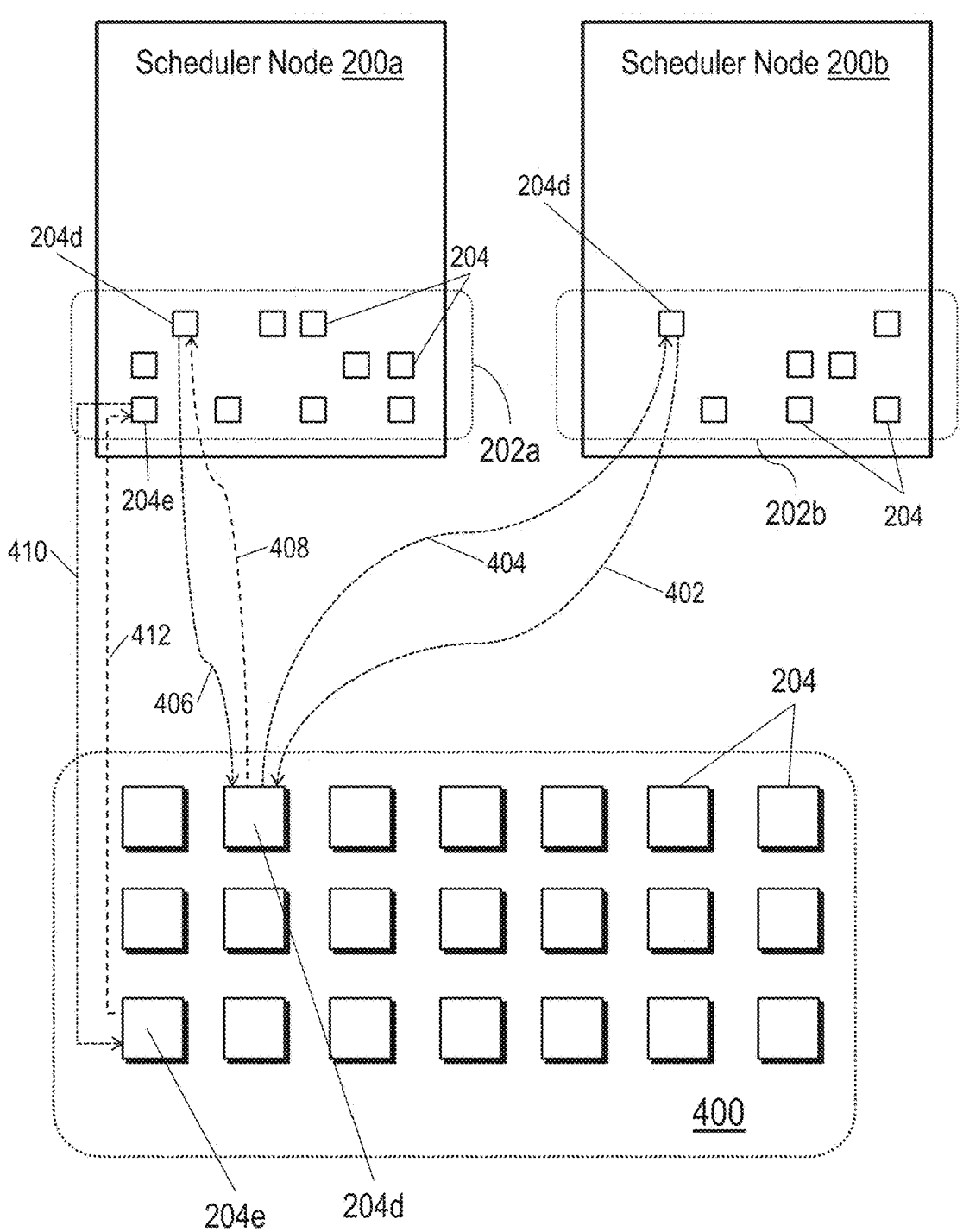
FIG. 4 is a diagrammatic illustration of scheduling operations of decentralized scheduler nodes of the unstable network of FIG. 1 according to example embodiments of this disclosure.

Referring to FIG. 4, the network 100 is shown.

In embodiments, the network 100 may comprise a network set 400 of network nodes 204 and multiple scheduler nodes 200a, 200b. For example, each scheduler node 200a, 200b may respectively maintain a set 202a, 202b of network nodes 204 respectively known to that scheduler node (e.g., each set 202a, 202b a subset of the network set 400). However, neither scheduler node 200a, 200b may have knowledge of, or connection to, every network node 204 within the network set 400. Similarly, each scheduler node 200a, 200b may not have knowledge of, or connection to, the other scheduler node (or of any other scheduler nodes that may enter or leave the network set 400).

In embodiments, conflict resolution within the network set 400 may be resolved by each network node 204d by rejecting any deployed job that may overcommit that network node. For example, the network node 204d may be known to both scheduler nodes 200a, 200b, although neither scheduler node may have knowledge of, or connection to, the other. In embodiments, the scheduler node 200b may deploy a job (402) to the network node 204d, e.g., as a result of the selection process described above. The network node 204d may acknowledge the deployment 402 by transmitting an acceptance (404) of the job to the scheduler node 200b. Subsequently, e.g., while the network node 204d is executing the deployed job or after the network node has accepted (404) said job, the scheduler node 200a may also execute the selection process described above and selects the network node 204d for deployment of a job. Upon deployment (406) of the job to the network node 204d, the network node may reject the job (as the network node has already committed to the job deployed (402) by the scheduler node 200b. Accordingly, the network node 204d may deny the deployment 406 of the job by transmitting a rejection (408) of the job to the scheduler node 200a. Upon receiving the rejection 408, the scheduler node 200a may redeploy the rejected job (410) to the network node 204e, which may accept (412) and proceed to execute the redeployed job. In embodiments, the network node 204e may be identified by the selection process (e.g., the same iteration that identified the network node 204d as the primary target for the job) as a suitable but less optimal candidate node, e.g., a candidate node having sufficient resource capacity and sufficient reliability, and/or for which $\Sigma (Q_k) \leq hP_{job}$, but less powerful (e.g., lower resource capacity, lower reliability) than the network node 204d.

Figures 5A, 5B:
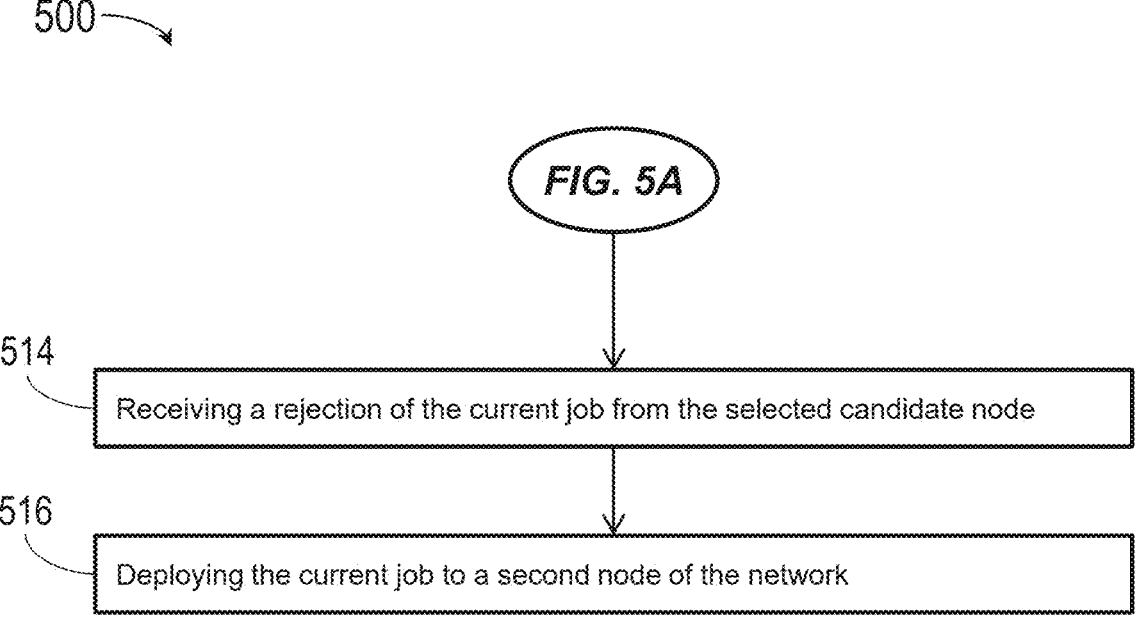
FIGS. 5A and 5B are flow diagrams illustrating a method for decentralized job scheduling among an unstable network of nodes according to example embodiments of this disclosure.

Referring now to FIG. 5A, the method 500 may be implemented by the scheduler nodes 200, 200a-200b and may include the following steps.

At a step 502, the scheduler node stores a list of jobs (e.g., input queue) for deployment to, and execution by, a network of nodes known to the scheduler node, each particular job having an execution time (e.g., amount of time to run to completion under optimal conditions), a priority level, and a resource requirement (e.g., number of cores necessary to execute within its allotted execution time). For example, the initial network of nodes may be a subset of a larger network set of nodes, where other nodes within the network set (and even other scheduler nodes) may be unknown to, and/or unconnected to, the scheduler node. The initial network may be unstable in that nodes may join or leave the network arbitrarily.

At a step 504, the scheduler node collects status information relevant to its set of network nodes. For example, the scheduler may scan its set of nodes to determine if nodes have left the network (and delete said nodes from its set), if new nodes are present and able to communicate with the network node (and add said nodes to its set). Further, the scheduler node may scan its set of network nodes to collect new status information (and/or historical status information) such as, for each node, a resource capacity (e.g., available processing cores, data storage, etc.) and/or node availability time (amount of time the node has been connected to the network/scheduler node and available for execution of jobs deployed to the node). If no new status information is available, the scheduler node may refer to its own stored historical status information; if newer status information is available, the scheduler node may update its stored status information accordingly.

For each current job on its stored list of jobs, the scheduler node executes a selection process for optimal deployment of the current job for execution by a node of the network. For example, the list of jobs may be a sequence or input queue to be followed in a particular order, or the list of jobs may grant a degree of discretion as to the order in which some or all jobs are deployed (e.g., higher priority jobs may take precedence over lower priority jobs).

At a step 506, the scheduler node determines, based on current status information (e.g., the resource capacity of each node), a first subset of suitable candidate nodes. For example, the first subset of suitable candidate nodes may include all nodes of the network having sufficient resource capacity to execute the current job (e.g., equivalent to or greater than the resource requirements of the current job).

At a step 508, the scheduler node determines, based on current status information (e.g., the node availability time of each node of the first subset), a second subset of candidate nodes within the first subset. For example, the second subset may include all suitable candidate nodes of the first subset having sufficient reliability to be available for execution the current job without failure during its execution time. For example, the scheduler node may determine a reliability function for each candidate node of the first subset based on its historical node availability time and the execution time of the current job, and exclude or remove from the second subset any candidate node of the first subset not having sufficient reliability (e.g., below a threshold level). In some embodiments, the second subset is ordered by resource capacity (e.g., in descending order); in some embodiments, the second subset is ordered both by resource capacity (primary order) and node reliability (secondary order, e.g., for two nodes of equal power/resource capacity, the more reliable node will be ordered first).

At a step 510, the scheduler node selects, from the second subset of sufficiently powerful and sufficiently reliable candidate nodes, a candidate node to which the current job will be deployed for execution. For example, the scheduler node may iterate through the set of candidate nodes, e.g., in descending order of resource capacity and/or reliability, assessing each candidate node in turn until a candidate node is found for which, should the current job be deployed to the candidate node, the probability of any subsequent job appearing to a scheduler nodes of the network during the execution time of the current job, said subsequent job having a greater resource requirement than that of the current job (and thus requiring the subsequent job wait in the input queue of its scheduler node until the candidate node is again available for job deployment) does not exceed a threshold level. For example, the subsequent job may be of any type, and the scheduler node may be any scheduler node of the network, including other scheduler nodes connected to the candidate node but unknown to the instant scheduler node. In some embodiments, if for the currently assessed candidate node the probability of the subsequent job appearing meets or exceeds the threshold level, the current candidate node is reserved and the scheduler node proceeds to assess the next most powerful node of the second subset. In some embodiments, if the probability of the subsequent job appearing exceeds the threshold level for every candidate node of the second subset, the last assessed candidate node (e.g., the least powerful candidate node, lowest resource capacity) is selected for execution of the current job.

At a step 512, the scheduler node deploys the current job to the selected candidate node.

Referring also to FIG. 5B, the method 500 may include additional steps 514 and 516. At the step 514, the scheduler node receives rejection of the deployed job by the selected candidate node.

At the step 516, the scheduler node redeploys the rejected job to an alternative candidate node. For example, the rejected job may be redeployed to the next most powerful candidate node (or the last candidate node) based on the original selection process. In some embodiments, the scheduler node reiterates the scheduling process.

Embodiments of the inventive concepts disclosed herein allow networks with unstable topologies and heterogenous computing resources to self-optimize by collecting and harnessing statistical information about the behavior of member nodes as well as computation jobs and tasks executed by the member nodes, even where a centralized shared state is impossible to implement. For example, rapid deployment and completion of computation jobs is optimized at the local level by independent greedy schedulers according to example embodiments of the inventive concepts disclosed herein, providing for a peer-to-peer architecture that minimizes wait times for the most powerful computation jobs. Decentralized scheduling architectures as disclosed herein may be implemented in heterogenous tactical and military networks or commercial networks of diverse interconnected assets alike.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A scheduler node comprising:
   one or more processors;
   memory operatively coupled to the one or more processors,
   the memory configured for storage of a list of one or more jobs for deployment to a network of nodes known to the scheduler node, each job associated with a job resources requirement and a job execution time; and
   a communications interface operatively coupled to the one or more processors, the communications interface configured for transmission to, and reception from, the network of nodes;
   the scheduler node configured to, for at least one current job of the list of one or more jobs:
   collect status information from the network of nodes, the status information including, for each node, one or more of a node resource capacity or a node availability time, wherein:
   each candidate node of a first subset of one or more candidate nodes within the network of nodes has a resource capacity greater than or equal to a sufficient resource capacity, wherein the sufficient resource capacity is based on the job resources requirement associated with the current job; and
   each candidate node of a second subset of candidate nodes within the first subset has a reliability sufficient for execution of the current job, wherein the reliability is based on a probability that the candidate node in the second subset can execute the current job based on the job execution time and the node availability time of the candidate node; and
   deploy the current job to a particular candidate node of the second subset for execution, wherein:
   the particular candidate node executes the current job;
   the particular candidate node is based on a local optimization of job deployments relative to other nodes in the network of nodes;
   the local optimization is based on a sum of one or more probability distributions associated with one or more subsequent jobs and a threshold probability level for each of the candidate nodes in the second subset;
   the threshold probability level is based on a probability that the candidate node of the second subset has at least one of a node resource capacity greater than or equal the job resources requirement of the one or more subsequent jobs or a reliability greater than or equal to a reliability sufficient for execution of the one or more subsequent jobs;
   the one or more probability distributions are based on (i) at least one of the job resources requirement and the resource capacity of each of the second subset of candidate nodes, and (ii) one or more cumulative distribution functions associated with one or more subsequent jobs appearing in the list of one or more jobs during the job execution time; and
   the one or more subsequent jobs are associated with a job resources requirement greater than the job resources requirement of the current job.

2. The scheduler node of claim 1, wherein the scheduler node is configured to collect, via the communications interface, the status information from at least one node of the network.

3. The scheduler node of claim 1, wherein:
   the memory is configured for storage of historical status information associated with the at least one node of the network of nodes; and
   the scheduler node is configured to collect the status information by retrieving the historical status information from the memory.

4. The scheduler node of claim 1, wherein the scheduler node is configured to modify the network of one or more nodes based on the collected status information by at least one of:
   adding at least one node to the network; or
   deleting at least one node from the network.

5. The scheduler node of claim 1, wherein at least one of the first subset of candidate nodes or the second subset of candidate nodes are ordered by node resource capacity.

6. The scheduler node of claim 5, wherein for each candidate node of the first subset, a node reliability is based at least on the execution time of the current job and the node availability time of the candidate node; and
   the order of the second subset of candidate nodes is ordered primarily by node resource capacity and secondarily by node reliability.

7. The scheduler node of claim 5, wherein the scheduler node is configured to generate the second subset of candidate nodes by removing each candidate node of the first subset from the first subset having a node reliability insufficient for the execution time.

8. The scheduler node of claim 5, wherein the particular candidate node has the highest node resource capacity in the second subset of candidate nodes according to a descending order of node resource capacity of the second subset of candidate nodes, and wherein the probability of the subsequent job appearing in the list of one or more jobs does not exceed a threshold level.

9. The scheduler node of claim 8, wherein:
   the probability of the subsequent job appearing in the list of one or more jobs exceeds the threshold level for each candidate node of the second subset; and
   the particular candidate node has the least node resource capacity in the second subset of candidate nodes.

10. The scheduler node of claim 1, wherein the particular candidate node is a first node of the network, and the scheduler node is configured to:
    receive a rejection of the deployed current job from the particular candidate node; and
    redeploy the current job to a different second node of the network.

11. A method comprising:
    storing, via a memory of a scheduler node, a list of one or more jobs for execution by a network of nodes known to the scheduler node, each job associated with a resource requirement and an execution time;
    collecting, via the scheduler node, status information from the network of nodes, the status information including, for each node, one or more of a node resource capacity or a node availability time, wherein:
    each candidate node of a first subset of one or more candidate nodes within the network of nodes has a resource capacity greater than or equal to a sufficient resource capacity, wherein the sufficient resource capacity is based on the job resources requirement associated with the current job; and
    each candidate node of a second subset of one or more candidate nodes within the first subset has a reliability sufficient for execution of the current job, wherein the reliability is based on a probability that the candidate node in the second subset can execute the current job based on the job execution time and the node availability time of the candidate node; and deploying the current job to a particular candidate node of the second subset for execution, wherein:

the particular candidate node executes the current job;

the particular candidate node is based on a local optimization of job deployments relative to other nodes in the network of nodes;

the local optimization is based on a sum of one or more probability distributions associated with one or more subsequent jobs and a threshold probability level for each of the candidate nodes in the second subset;

the threshold probability level is based on a probability that the candidate node of the second subset has at least one of a node resource capacity greater than or equal the job resources requirement of the one or more subsequent jobs or a reliability greater than or equal to a reliability sufficient for execution of the one or more subsequent jobs;

the one or more probability distributions are based on (i) at least one of the job resources requirement and the resource capacity of each of the second subset of candidate nodes, and (ii) one or more cumulative distribution functions associated with one or more subsequent jobs appearing in the list of one or more jobs during the job execution time; and the one or more subsequent jobs are associated with a job resources requirement greater than the job resources requirement of the current job.

12. The method of claim 11, wherein collecting, via a scheduler node, status information associated with a network of two or more nodes communicatively coupled to the scheduler node includes: collecting the status information from at least one node of the network.

13. The method of claim 11, wherein: storing, via a memory of a scheduler node, a list of one or more jobs for deployment to a network includes storing, via the memory, historical status information associated with the network of nodes; and wherein collecting, via the scheduler node, status information associated with the one or more nodes includes retrieving the historical status information from the memory.

14. The method of claim 11, wherein collecting, via the scheduler node, status information associated with the one or more nodes includes at least one of:

adding at least one node to the network based on the collected status information; or deleting at least one node from the network based on the collected status information.

15. The method of claim 11, wherein at least one of the first subset or the second subset of one or more candidate nodes are ordered by node resource capacity.

16. The method of claim 15, wherein for each candidate node of the first subset, a node reliability is based at least on the node availability time of the candidate node; and the ordering of the second subset of one or more candidate nodes is ordered primarily by node resource capacity and secondarily by node reliability.

17. The method of claim 16, further comprising:

removing, from the first subset, each candidate node of the first subset having a node reliability insufficient for the execution time.

18. The method of claim 15, wherein the particular candidate node has the highest node resource capacity in the second subset of candidate nodes according to a descending order of node resource capacity of the second subset of candidate nodes, and wherein the probability of the subsequent job appearing in the list of one or more jobs does not exceed a threshold level.

19. The method of claim 18, wherein the probability of the subsequent job appearing in the list of one or more jobs exceeds the threshold level for each candidate node of the second subset, and wherein the particular candidate node has the least node resource capacity in the second subset of candidate nodes.

20. The method of claim 11, wherein the particular candidate node is a first node of the network, the method further comprising:

receiving, via the scheduler node, a rejection of the current job from the particular candidate node; and deploying, via the scheduler node, the current job to a different second node of the network.

* * * * *